Patented Nov. 20, 1928.

1,691,994

UNITED STATES PATENT OFFICE.

ROBERT E. ROSE, OF PENNS GROVE, NEW JERSEY, ASSIGNOR TO E. I. DU PONT DE NEMOURS & COMPANY, OF WILMINGTON, DELAWARE, A CORPORATION OF DELAWARE.

SOFTENER FOR SILK AND PROCESS FOR MAKING SAME.

No Drawing. Application filed November 17, 1925. Serial No. 69,711.

This invention relates to a process and product to be employed in the art of manufacturing genuine or artificial silk textiles of superior quality and weight.

In the manufacture of tin weighted genuine silk and often, also, in the manufacture of artificial silk it is desirable to use a softener or lubricant to impart to the fabric the proper texture, appearance, durability and feel. It is customary to employ in this capacity sulfonated castor oil.

I have found that the products of the reaction which occurs when sulfonated castor oil is treated with a substituted guanidine, which products are most probably, and will hereinafter be referred to as, the guanidine salts of the sulfonated oil, are far superior as softeners to the ordinary sulfonated castor oil. They are most excellent for treating tin weighted genuine silk and are also well adapted for treating artificial silk. These salts have the advantage that they dry better than the sulfonated oil, and do not show as great a tendency to spot the fabric. Also, they act as a better lubricant than anything hitherto employed in this art, so far as we are aware. Furthermore, their presence in the fibre seems to enable the silk to absorb more moisture and thereby appreciate in weight.

In presenting a preferred example of my process I have chosen as the specific guanidine used for the preparation of the softener, di-ortho-tolyl-guanidine, but the substituted guanidines generally and their various isomers are adapted for use. Thus diphenyl guanidine may be employed or even triphenyl, but the tri-substituted guanidines give rise to products that are too insoluble, and do not emulsify well enough to yield the best results.

The following procedure has been used with very good success, but is only one example of my method:

10 lbs. of the ammonium salt of sulfonated castor oil are heated to about 60° C. (the temperature may be varied within a wide range). Into the liquid are stirred 2 lbs. di-ortho-tolyl-guanidine. The mass is now heated until it becomes entirely homogeneous which occurs in a few minutes, heating being continued so that the temperature may rise to 90° C. at the end of the operation. Some ammonia is given off and the liquid is ready for use.

The method of preparation as well as the particular guanidine employed may be varied. For example, it is obvious that the sulfonated castor oil instead of its ammonium salt may be used, this being neutralized by the addition of guanidine and then made slightly alkaline with ammonia, or it is possible to use the sodium salt of the sulfonated castor oil and treat this with a salt of the guanidine chosen such as the chloride. In this case sodium chloride or other sodium salt is formed, which sometimes crystallizes out but the product is essentially the same as in the other examples.

Also the amount of guanidine employed can be varied over a considerable range without altering the nature of the softener because the guanidine which does not react to form a salt will simply remain in solution.

The softener, when prepared by any of the methods indicated above, may be applied to the silk in any appropriate manner. For example, it may be applied after the silk is dyed by soaking the fibre in an emulsion of the softener for 10 minutes at a temperature of 90° F. The amount of softener employed in a given case will depend on the feel which the dyer wishes to impart to the finished silk. An emulsion containing about 5 ozs. (for 10 gallons) of the softener is the average quantity.

By the term "silk", wherever employed throughout the specification and claims without the modifiers "artificial" or "genuine", it is intended to designate both varieties, genuine and artificial.

I claim as my invention:

1. A softener for silk comprising a guanidine salt of sulfonated castor oil.

2. A softener for silk comprising an aryl-guanidine salt of sulfonated castor oil.

3. A softener for silk comprising a tolyl-guanidine salt of sulfonated castor oil.

4. The di-ortho-tolyl-guanidine salt of sulfonated castor oil.

5. The process of softening silk which comprises the step of treating the fibre with a tolyl-guanidine salt of sulfonated castor oil.

6. The process of softening tin weighted silk which comprises the step of treating the weighted silk with an emulsion of an aryl-guanidine salt of sulfonated castor oil.

7. The process of preparing a softener for silk which comprises adding a substituted guanidine to a compound comprising a sulfonated residue of ricinoleic acid.

8. The process of preparing a softener for silk which comprises the step of adding to a compound comprising sulfonated castor oil, di-ortho-tolyl-guanidine.

9. The process of preparing a softener for silk which comprises the step of adding to a compound comprising a salt of sulfonated castor oil, an aryl-guanidine.

10. A silken textile containing as a softener a guanidine salt of sulfonated castor oil.

11. A process of lubricating and softening silk which comprises adding a substituted guanidine to a compound comprising sulfonated castor oil and soaking the silk in an emulsion of the resulting product.

12. As a new compound, the product obtainable by reacting a substituted guanidine with a compound comprising a sulfonated residue of ricinoleic acid.

13. As a new compound, the product obtainable by reacting sulfonated castor oil with di-ortho-tolyl-guanidine.

14. A silken textile impregnated with the product obtainable by reacting a sulfonated residue of ricinoleic acid with a substituted guanidine.

In testimony whereof I affix my signature.
ROBERT E. ROSE.